United States Patent

Sawada et al.

[19]

[11] Patent Number: 6,118,116
[45] Date of Patent: Sep. 12, 2000

[54] IMAGE READING APPARATUS HAVING A MEMORY WITH COMPRESSED IMAGE DATA

[75] Inventors: Koichi Sawada; Hideki Wanami, both of Kanagawa; Makoto Goto, Tokyo, all of Japan

[73] Assignee: Sony Corporation, Tokyo, Japan

[21] Appl. No.: 09/136,756

[22] Filed: Aug. 19, 1998

[30] Foreign Application Priority Data

Aug. 21, 1997 [JP] Japan ................................. 9-224147

[51] Int. Cl.$^7$ ................................................. H01L 27/00
[52] U.S. Cl. ..................... 250/208.1; 358/468; 382/232
[58] Field of Search .................. 250/208.1, 234; 358/401, 404, 462, 468; 382/232, 235

[56] References Cited

U.S. PATENT DOCUMENTS

5,130,525  7/1992  Ryon ................................. 250/208.1

*Primary Examiner*—Que T. Le
*Attorney, Agent, or Firm*—Jay H. Maioli

[57] ABSTRACT

In an image reading apparatus, a film scanner shortens the time required for transferring image data by transferring image data that is compressed in the JPEG format to a computer in response to a request from the computer. On the computer side, the time required for recording image data in the hard disk drive can be shortened and an ensuing process can be simplified so that the time required for capturing and processing image data can be shortened.

11 Claims, 5 Drawing Sheets

IMAGE READING APPARATUS HAVING A MEMORY WITH COMPRESSED IMAGE DATA

BACKGROUND OF THE INVENTION

1. Field of the Invention

The present invention relates to an image reading apparatus and can be applied to a scanner, for instance. The invention is intended to shorten the time required for transferring image data by transmitting captured image data to an external apparatus after compressing it.

2. Description of the Related Art

Conventionally, a scanner is connected to, for instance, a computer so that images can be processed in the computer.

Specifically, the scanner reads, at a high resolution, a two-dimensional image with a line sensor while moving it sequentially, and outputs captured image data to the computer via an interface such as SCSI (small computer system interface) or Centronics.

At this time, the scanner intermittently outputs, to the computer, image data that are output from the line sensor by using an internal line memory as a buffer memory. That is, the scanner temporarily stores image data that are output from the line sensor in the internal line memory. When the storage area of the line memory has been used up, the image data capturing by the line memory is suspended and image data stored in the line memory are output to the computer. Upon completion of the transfer of the image data that are stored in the line memory, the image data capturing by the line memory is restarted. Image data are output to the computer by repeating the above series of processes.

Incidentally, this type of scanner may be applied to a film scanner. The film scanner is used in a service of forming an electronic file by inputting images of a plurality of consecutive frames to a computer in what is called a mini-laboratory (i.e., a store in a town in which developing and fixing of photographs are performed). The film scanner is also used to form an image database; for example, as in the above case, image data are obtained by reading consecutive images and thumb nail images for indices are formed. In this type of use environments, conventional film scanners have a problem that the image data transfer takes long time.

For example, when images of a 35-mm film are read at a resolution of 3,072×2,048 (about 2,000 dpi) with a film scanner of the above type, captured image data will amount to about 18 MB. When those image data are transmitted at a transmission rate of, for instance, 1 MB/s, only the transmission of the image data takes about 18 seconds.

When image data of about 18 MB are processed by a computer, in the computer the image data is held in a virtual memory formed on a hard disk drive. Image data that is input from the film scanner needs to be recorded onto the hard disk drive each time.

As for the transfer of image data from the film scanner, image data are transmitted intermittently after the completion of each recording onto the hard disk drive. Therefore, in an actual transfer operation, only the transfer of image data takes more than 18 seconds.

In conventional film scanners, the transfer of image data takes long time as described above and hence it is difficult to capture image data from a plurality of consecutive frames in a short time.

SUMMARY OF THE INVENTION

The present invention has been made in view of the above points, and an object of the invention is therefore to provide an image reading apparatus capable of shortening the time required for transferring image data.

The invention provides an image reading apparatus comprising capturing means for capturing image data; adjusting means for adjusting image data; a memory for storing the image data; memory control means for controlling data writing and reading to and from the memory; data compressing means for compressing the image data that is stored in the memory into compressed image data; and transmission control means for performing a control for transmitting the compressed image data via an interface of data communication.

The data compressing means may compress the image data according to a predetermined format for compression of a still image.

The data compressing means may compress the image data so that the compressed image data will have a data amount close to a target data amount that is specified by a command that is input via the interface.

The memory control means may change the size of an image of the image data by reading out the image data from the memory while decimating the image data at a ratio that is specified by a command that is input via the interface.

The memory control means may change the resolution of an image of the image data by reading out the image data from the memory at a resolution that is specified by a command that is input via the interface.

The memory control means may generate image data for a thumb nail image by reading out the image data from the memory at a low resolution that is specified by a command that is input via the interface.

The adjusting means may correct the gradation of the image data based on a specification that is indicated by a command that is input via the interface.

The adjusting means may execute a negative-to-positive inversion process on the captured image data when a subject of reading of the capturing means is a negative film.

The adjusting means may adjust the image data according to a default characteristic in a pre-scan.

The adjusting means may adjust the image data according to a default characteristic when the image data is not to be compressed by the data compressing means.

The adjusting means may comprise a bus switch, and by switching the bus switch the adjusting means may supply the image data to the data compressing means when the image data is to be compressed by the data compressing means and supply the image data to the transmission control means when the image data is not to be compressed.

DETAILED DESCRIPTION OF THE PREFERRED EMBODIMENT

An embodiment of the present invention will be hereinafter described in detail with reference to the accompanying drawings.

Figure 1:
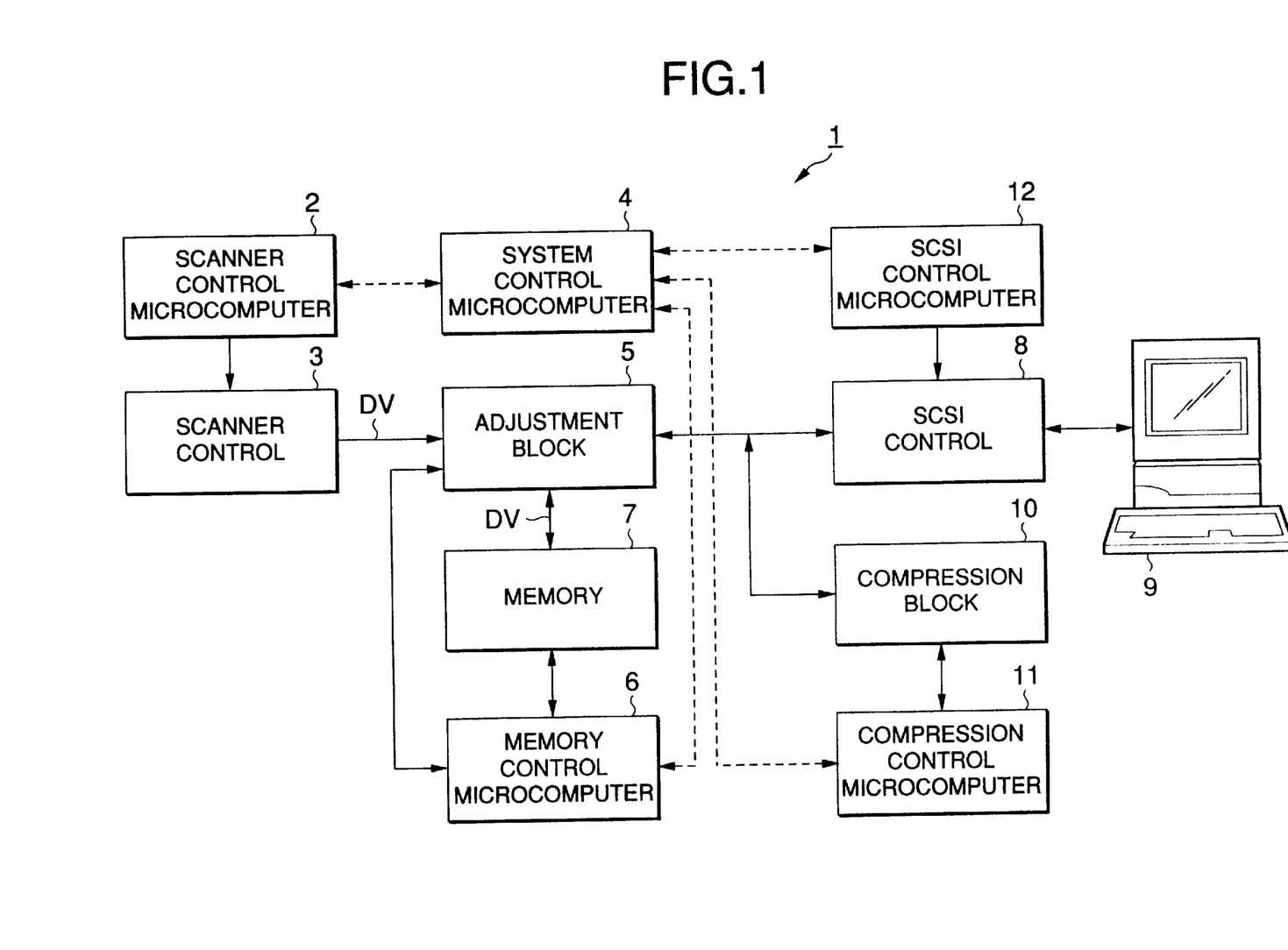
FIG. 1 is a block diagram showing a control system of a film scanner according to an embodiment of the invention.

FIG. 1 is a block diagram showing a control system of a film scanner 1 according to an embodiment of the invention. In a pre-scan, the film scanner 1 consecutively captures, as image data, images of a plurality of frames of a film that is held by a proper reel or holder and outputs resulting image data DV to a computer 9. After corrections of hue etc. have been made in accordance with manipulations on the computer 9, in a main scan the images of the film are read frame by frame in such a manner that the corrections of hue etc. are reflected. Captured image data are output to the computer 9 in a desired format.

In the film scanner 1, a scanner control microcomputer 2 controls the operation of a scanner control 3 under the control of a system control microcomputer 4. The scanner control 3, which is composed of an optical system for capturing image data from a film and a signal processing system, outputs captured image data DV to an adjustment block 5.

Constituted of, for instance, look-up tables whose contents are altered under the control of a memory control microcomputer 6, the adjustment block 5 corrects the gradation and the hue of image data DV that is output from the scanner control 3 or held by a memory 7 when necessary and outputs corrected image data.

The memory 7, which is constituted of a large-capacity buffer capable of accommodating compressed image data having a size of at least (2,048×3,072 pixels)×3 colors, temporarily holds and then outputs image data DV captured by the scanner control 3 or image data compressed by a compression block 10.

The memory control microcomputer 6 controls the operations of the adjustment block 5 and the memory 7 under the control of the system control microcomputer 4.

The compression block 10 compresses image data that is output from the adjustment block 5 and sends compressed image data to the memory 7. A compression control microcomputer 11 controls the operation of the compression block 10 under the control of the system control microcomputer 4.

A SCSI control 8, which is composed of an integrated circuit that is a SCSI (small computer system interface) protocol controller, a buffer memory for holding image data temporarily, and peripheral circuits, performs input/output of various control commands etc. between the computer 9 as an external apparatus according to the SCSI functions as well as sends image data to the computer 9.

A SCSI control microcomputer 12, which is a microcomputer for controlling the SCSI control 8, judges the legitimacy of a control command or the like that is input from the computer 9 and informs the system control microcomputer 4 of it, and informs the computer 9 of a request, an operation result, or the like that is sent from the system control microcomputer 4.

The system control microcomputer 4, which is a microcomputer for controlling the operation of the entire film scanner 1, receives and interprets a control command (SCSI command) that is transmitted from the computer 9 via the SCSI control microcomputer 12. Based on an interpretation result of the command, the system control microcomputer 4 issues necessary control commands etc. to other control microcomputers such as the scanner control microcomputer 2, thereby controlling the operation of the entire film scanner 1 in accordance with the request from the computer 9. Further, the system control microcomputer 4 forms a status or the like to be sent to the computer 9 based on status data that is input from other control microcomputer such as the scanner control microcomputer 2, and sends it to the computer 9.

Figure 2:
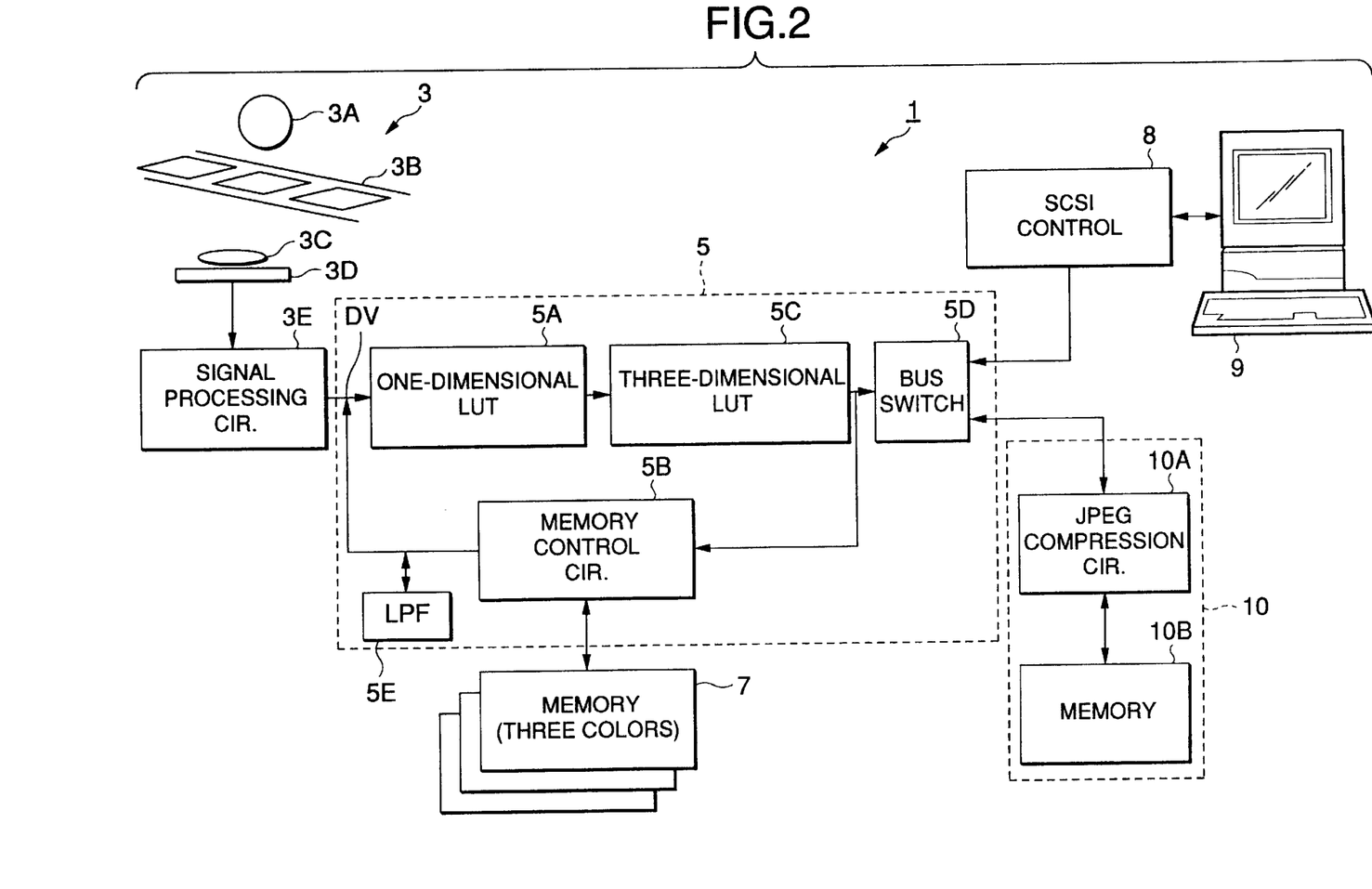
FIG. 2 is a block diagram showing an image data processing system of the film scanner of FIG. 1.

FIG. 2 is a block diagram showing a detailed configuration of an image data processing system of the film scanner 1. In the scanner control 3 of the film scanner 1, a film 3B is illuminated by a proper light source 3A and resulting transmission light is focused on a line sensor 3D with a lens 3C. Further, in the scanner control 3, color signals of red, blue and green that have been obtained by the line sensor 3D are input to a signal processing circuit 3E, which performs analog-to-digital conversion to convert the color signals into 12-bit image data DV.

At this time, the scanner control 3 corrects the gradation of the image data DV according to a prescribed characteristic and outputs corrected image data. In a pre-scan, under the control of the scanner control microcomputer 2, the scanner control 3 consecutively reads, at a resolution of 128×192 pixels, images of respective frames of the film 3B while sequentially moving the film 3B that is held by a proper reel or holder. On the other hand, in a main scan, the scanner control 3 reads the images of the film 3B frame by frame at a resolution and an image size that are set via the system control microcomputer 4 and outputs image data.

In the adjustment block 5, a one-dimensional look-up table 5A converts 12-bit image data DV into 8-bit image data and, if necessary, corrects its gradation, and outputs resulting image data. In this process, in a pre-scan, the contents of the one-dimensional look-up table 5A is set to a default input/output characteristic that does not correct the gradation of image data DV at all, and the one-dimensional look-up table 5A processes image data DV that are sequentially input from the signal processing circuit 3E according to the default input/output characteristic and outputs resulting image data. On the other hand, in an adjustment process that follows the pre-scan, the contents of the one-dimensional look-up table 5A are updated under the control of the system control microcomputer 4 that reflects an instruction from the computer 9, the one-dimensional look-up table 5A sequentially processes image data that has been input via a memory control circuit 5B and held by the memory 7 according to the updated contents and outputs processed image data.

As described above, while in a pre-scan the one-dimensional look-up table 5A does not perform any correction on the gradation of image data DV that are sequentially captured from the film 3B, in a subsequent adjustment process the one-dimensional look-up table 5A corrects the gradation of image data DV that is held by the memory 7 in accordance with an instruction of an operator who manipulates the computer 9 and outputs corrected image data.

In a main scan, the one-dimensional look-up table 5A corrects the gradation of image data DV that are sequentially input from the signal processing circuit 3E according to an input/output characteristic that is specified by the computer 9 and outputs corrected image data. Further, in a process of compressing image data, a process of outputting compressed image data, or a process of outputting uncompressed image data each of which is executed after the main scan, the one-dimensional look-up table 5A processes image data that is input from the memory 7 via the memory control circuit 5B according to the default characteristic and outputs processed image data.

The contents of a three-dimensional look-up table 5C are updated under the control of the system control microcomputer 4 that reflects an instruction from the computer 9, and the three-dimensional look-up table 5C outputs image data corresponding to a set of red, blue, and green image data that is output from the one-dimensional look-up table 5A. In this manner, in a case where image data DV is captured from a negative film 3B, the three-dimensional look-up table 5C executes what is called a negative-to-positive inversion process. If necessary, the three-dimensional look-up table 5C corrects the hue of the image data DV.

Specifically, in a pre-scan, the three-dimensional look-up table 5C stores image data that is output from the one-dimensional look-up table 5A in the memory 7 via the memory control circuit 5B without correcting the image data at all by using a default characteristic. In an adjustment process that follows the pre-scan, the three-dimensional look-up table 5C corrects the hue of image data DV that has been input from the one-dimensional look-up table 5A and stored in the memory 7 in accordance with an instruction of an operator who manipulates the computer 9, and outputs corrected image data to the SCSI control via a bus switch 5D. If the film 3B is a negative film, the three-dimensional look-up table 5C executes the negative-to-positive inversion process.

In a main scan, the three-dimensional look-up table 5C corrects the hue of image data DV that is output from the one-dimensional look-up table 5A according to a characteristic that is instructed from the computer 9, and stores corrected image data in the memory 7 via the memory control circuit 5B. On the other hand, in a process of compressing image data, a process of outputting compressed image data, or a process of outputting uncompressed image data each of which is executed after the main scan, the one-dimensional look-up table 5A processes image data that is input from the memory 7 via the one-dimensional look-up table 5A according to the default characteristic and outputs processed image data.

The memory control circuit 5B switches the address control on the memory 7 under the control of the memory control microcomputer 6, whereby, when necessary, the memory control circuit 5B stores image data DV that is input from the scanner control 3 or image data that has been compressed by the compression block 10, or outputs image data thus stored in the memory 7.

Specifically, in a pre-scan, the memory control circuit 5B stores image data that is output from the three-dimensional look-up table 5C in the memory 7. In an adjustment process that follows the pre-scan, the memory control circuit 5B outputs the image data that is held by the memory 7 to the one-dimensional look-up table 5A. Therefore, the adjustment block 5 operates in the following manner. In the pre-scan, image data DV that is input from the scanner control 3 is stored in the memory 7 via the one-dimensional and three-dimensional look-up tables 5A and 5C that are set to the default characteristics. In the adjustment process that follows the pre-scan, the gradation and the hue of the image data DV that is held by the memory 7 are corrected by the one-dimensional and three-dimensional look-up tables 5A and 5C, respectively, and corrected image data is output.

In a main scan, the memory control circuit 5B stores image data that is output from the three-dimensional look-up table 5C in the memory 7. As a result, the gradation and the hue of image data DV are corrected according to characteristics that are instructed from the computer 9 and corrected image data is stored in the memory 7.

In a process of compressing image data, a process of outputting compressed image data, or a process of outputting uncompressed image data each of which is executed after the main scan, the memory control circuit 5B outputs image data that is held by the memory 7 to the one-dimensional look-up table 5A. Therefore, in the adjustment block 5, image data that is held by the memory 7 is processed according to the default characteristics and resulting image data is output. In the process of outputting compressed image data, the memory control circuit 5B causes uncompressed image data that is pre-stored in the memory 7 to be transferred to the compression block 10 and to be compressed there, stores resulting compressed image data in the memory 7, and then outputs the image data held by the memory 7.

In the above series of processes, under the control of the system control microcomputer 4 that is performed via the memory control microcomputer 6, the memory control circuit 5B changes the read address of image data DV that is held by the memory 7 or outputs image data DV that is held by the memory 7 after decimating it. In this manner, an image that is held by the memory 7 is output at a desired size and resolution.

The bus switch 5D controls the input/output of image data between the three-dimensional look-up table 5C, the memory control circuit 5B, and the compression block 10. Specifically, in a pre-scan, an adjustment process that follows the pre-scan, or an a process of outputting compressed image data or uncompressed image data that is executed after the main scan, the bus switch 5D supplies output data of the three-dimensional look-up table 5C to the SCSI control 8. On the other hand, in a process of compressing image data, the bus switch 5D supplies output data of the three-dimensional look-up table 5C to the compression block 10 and supplies image data that has been compressed by the compression block 10 to the memory control circuit 5B.

The adjustment block 5 has a two-dimensional low-pass filter 5E. When image data that is held by the memory 7 is to be output after being decimated, image data that is read out from the memory 7 is input to the one-dimensional look-up table 5A via the low-pass filter 5E. In this manner, the adjustment block 5 outputs image data that is held by the memory 7 after changing its resolution and image size while effectively avoiding occurrence of an aliasing distortion.

In the compression block 10, a JPEG compression circuit 10A converts image data DV that is input via the bus switch 5D into data of luminance/color difference signals and compresses the latter data according to a format prescribed by JPEG (joint photographic coding experts group). JPEG is a technique for compressing still image by a factor of 10–100. The JPEG compression circuit 10A compresses image data into a target data amount that is specified by the computer 9 under the control of the compression control microcomputer 11. A memory 10B temporarily holds image data that has been compressed by the JPEG compression circuit 10A and outputs the thus-held image data to the bus switch 5D.

Figure 3:
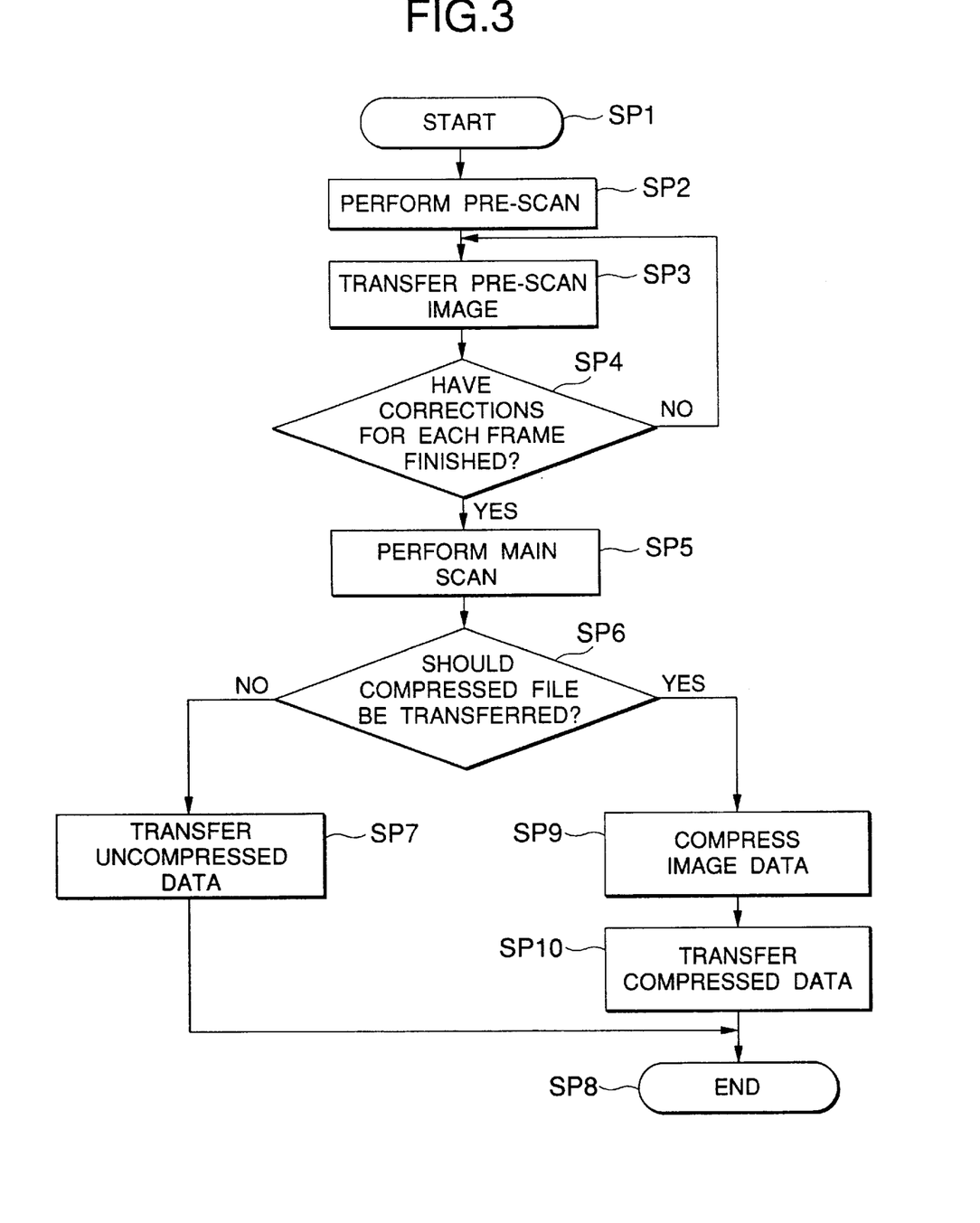
FIG. 3 is a flowchart showing a processing procedure of a system control microcomputer of the film scanner shown in FIG. 1.

FIG. 3 is a flowchart showing a processing procedure of the system control microcomputer 4. In the system control microcomputer 4, when it receives a pre-scan control command from the computer 9, the process goes from step SP1 to step SP2. At step SP2, the system control microcomputer 4 executes a pre-scan process by controlling the scanner control microcomputer 2 and the memory control microcomputer 6. Specifically, the system control microcomputer 4 causes the film 3B that is held by a proper reel or holder at a constant speed (see FIG. 2) and causes image data DV to be captured sequentially from images of a plurality of frames.

Further, the system control microcomputer 4 stores the captured image data in the memory 7 via the one-dimensional and three-dimensional look-up tables 5A and 5C that are set to the default characteristics. In this manner, the system control microcomputer 4 stores the images of the respective frames of the film 3B in the memory 7 without correcting those at all.

Then, at step SP3, the system control microcomputer 4 transfers the image data DV of the plurality of frames that are stored in the memory 7 to the computer 9 by controlling the memory control microcomputer 6 and the SCSI control microcomputer 12. Specifically, the system control microcomputer 4 causes the image data DV to be read out sequentially from the memory 7 and causes the read-out image data DV to be output to the computer 9 via the one-dimensional and three-dimensional look-up tables 5A and 5C that are set to the default characteristics. In this manner, in this embodiment, the images of the respective frames of the film 3B can be checked on the computer 9.

In this step, if the film 3B is a negative film, the system control microcomputer 4 causes the three-dimensional look-up table 5C to execute a negative-to-positive inversion process by properly setting its characteristic and sends resulting image data to the computer 9. Therefore, the film scanner 1 allows a calculation for negative-to-positive conversion to be omitted in the computer 9 and the load on the computer 9 side can be reduced accordingly.

Then, at step SP4, the system control microcomputer 4 judges for each of the pre-scanned frames whether corrections of hue, gradation, etc. have completed. If an instruction for an adjustment of hue, gradation, or the like is made from the computer 9 in response to a manipulation of an operator who has visually checked the image of each frame on the display screen of the computer 9, a negative judgment result is obtained at step SP4 and the process returns to step SP3.

In this case, at step SP3, the system control microcomputer 4 updates the contents of the one-dimensional and three-dimensional look-up tables 5A and 5C in accordance with a control command that has been input from the computer 9, and again sends image data DV that is held by the memory 7. In this manner, in the pre-scan, the system control microcomputer 4 causes the gradation and the hue of image data to be corrected and causes corrected image data to be output.

The system control microcomputer 4 accepts an alteration to the gradation etc. on a frame-by-frame basis, and changes the contents of the one-dimensional and three-dimensional look-up tables 5A and 5C and the operation of the memory control circuit 5B in accordance with the content of the accepted alteration. Therefore, the film scanner 1 allows calculations for adjusting the gradation etc. to be omitted in the computer 9 and the load on the computer 9 side can be reduced accordingly.

When corrections of hue etc. have been completed for the respective frames, the system control microcomputer 4 receives a main scan control command from the computer 9. Therefore, an affirmative judgment result is obtained at step SP4 and the process goes to step SP5. At step SP5, the system control microcomputer 4 executes a main scan process by controlling the scanner control microcomputer 2 and the memory control microcomputer 6.

That is, the system control microcomputer 4 causes the film 3B to be rewound and causes image data DV to be captured sequentially from an image of one frame. The system control microcomputer 4 stores the image data DV in the memory 7 via the one-dimensional and three-dimensional look-up tables 5A and 5C. At this time, the system control microcomputer 4 sets, via the memory control microcomputer 6, the one-dimensional and three-dimensional look-up tables 5A and 5C to characteristics that are specified by the computer 9, and thereby stores, in the memory 7, the image data DV whose gradation and hue are adjusted to those of the pre-scanned images. If the film 3B is a negative film, the image data DV are stored in the memory 7 after being subjected to negative-to-positive conversion.

Then, at step SP6, the system control microcomputer 4 judges whether a compressed transfer mode is designated by the computer 9. If a negative judgment result is obtained at step SP6, the process goes to step SP7, where the system control microcomputer 4 transfers image data DV of one frame that is stored in the memory 7 to the computer 9 by controlling the memory control microcomputer 6 and the SCSI control microcomputer 12. That is, the system control microcomputer 4 causes the image data DV to be sequentially read out from the memory 7 and causes the read-out image data DV to be output to the computer 9 via the one-dimensional and three-dimensional look-up tables 5A and 5C that are set to the default characteristics.

In the above step, the system control microcomputer 4 causes, by properly setting the memory control circuit 5B, the image data DV to be output after being read out from the memory 7 so as to be cut out in accordance with an instruction from the computer 9. Further, the system control microcomputer 4 causes the image data DV to be output after being decimated in response to a request from the computer 9. In this manner, the system control microcomputer 4 causes the image data DV to be output at a desired image size and resolution. Since the film scanner 1 sends the image data DV that has the same hue, gradation, image size, and resolution as determined in the pre-scan, the load on the computer 9 side can be reduced by an amount corresponding to processes for those items.

When the image data held by the memory 7 has been sent to the computer 9, the process of the system control microcomputer 4 goes to step SP8 and finishes there. When an instruction to capture image data DV of another frame is made from the computer 9, steps SP5–SP6–SP7 are executed after the above execution of step SP7. In this manner, images desired by the operator are sequentially transferred to the computer 9.

On the other hand, when an instruction to transfer compressed image data is made from the computer 9, an affirmative judgment result is obtained at step SP6 and hence the process of the system control microcomputer 4 goes to step SP9, where a process of compressing image data that is held by the memory 7 is executed. Specifically, after setting the one-dimensional and three-dimensional look-up tables 5A and 5C to the default characteristics by controlling the memory control microcomputer 6 and the compression control microcomputer 11, the system control microcomputer 4 transfers image data DV of one frame that is stored in the memory 7 to the JPEG compression circuit 10A via the one-dimensional and three-dimensional look-up tables 5A and 5C.

In the above step, the system control microcomputer 4 causes, by properly setting the memory control circuit 5B, the image data DV to be output after being read out from the memory 7 so as to be cut out in accordance with an instruction from the computer 9. Further, the system control microcomputer 4 causes the image data DV to be output after being decimated in response to a request from the computer 9. In this manner, the system control microcomputer 4 causes the image data to be output at a desired image size and resolution. Also in the case of compressing image data, since the film scanner 1 sends image data DV that has the same hue, gradation, image size, and resolution as determined in the pre-scan, the load on the computer 9 side can be reduced by an amount corresponding to processes for those items. After compressed by the JPEG compression circuit 10A, the image data is stored in the memory 7 via the bus switch 5D.

Then, the process step SP10, where the system control microcomputer 4 transfers the compressed image data that is stored in the memory 7 to the computer 9 by controlling the memory control microcomputer 6 and the SCSI control microcomputer 12. That is, the system control microcomputer 4 causes the compressed image data to be sequentially read out from the memory 7 and causes the read-out image data DV to be output to the computer 9 via the one-dimensional and three-dimensional look-up tables 5A and 5C that are set to the default characteristics.

When the compressed image data has been sent to the computer 9 in the above manner, the process of the system control microcomputer 4 goes to step SP8 and finishes there. When an instruction to capture image data DV of another frame is made from the computer 9, steps SP5-SP6-SP9-SP10 are executed after the above execution of step SP10. In this manner, images desired by the operator are sequentially transferred to the computer 9.

Figure 4:
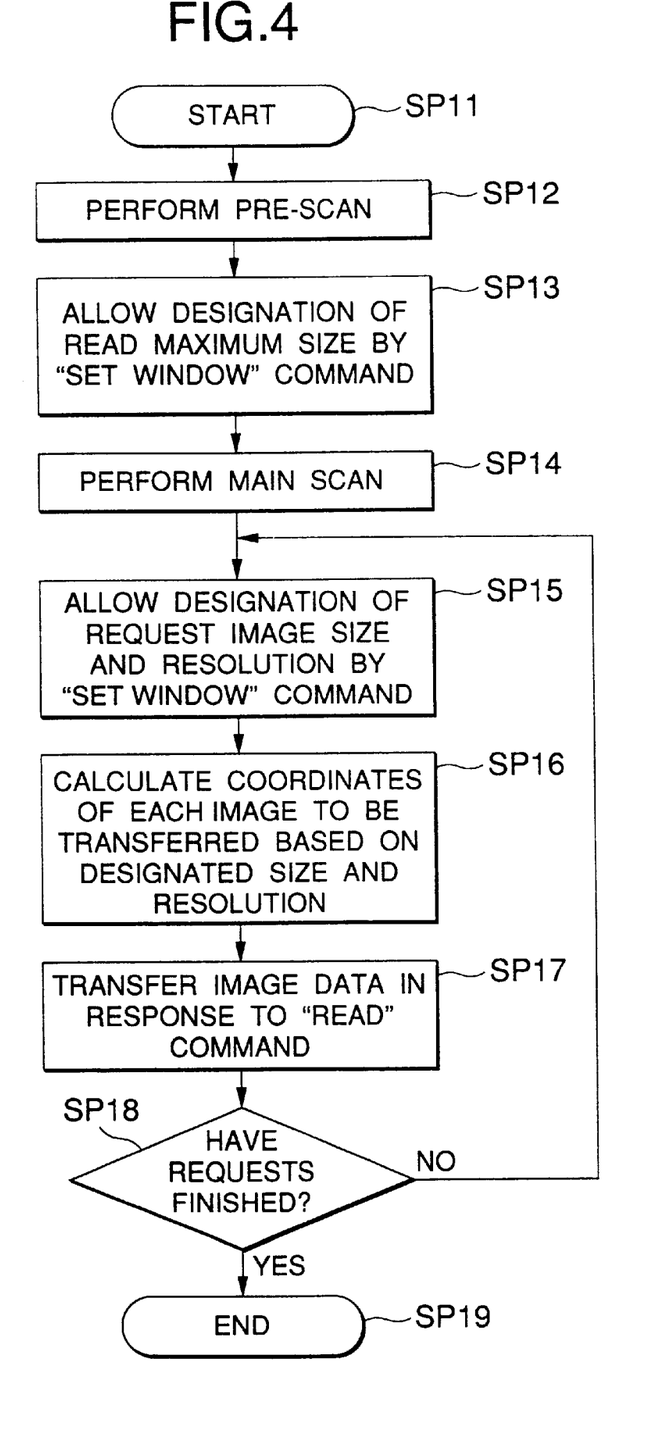
FIG. 4 is a flowchart showing a process of transferring image data at a specified resolution and image size.

FIG. 4 is a flowchart showing a detailed processing procedure of the system control microcomputer 4 for transferring image data DV stored in the memory 7. This flowchart is focused on the setting of an image size and a resolution.

The process goes from step SP11 to SP12, where the system control microcomputer 4 captures image data DV in the memory 7 by a pre-scan. At the next step SP13, the system control microcomputer 4 accepts specification of a read size that is made by a "set window" command that is sent from the computer 9. As described above in connection with step SP3, the system control microcomputer 4 also accepts specification of hue, gradation, etc. that is made by the same control command.

Then, the process goes to step SP14, where the system control microcomputer 4 executes a main scan process at a resolution that is specified by the above control command. For example, image data DV is captured at a resolution of 2,048 dpi (2,048×3,072 pixels).

Then, the process goes to step SP15, where the system control microcomputer 4 accepts specification of a resolution and a request size of the image data DV that is made by a "set window" command that is sent from the computer 9.

Then, the process goes to step SP16, where the system control microcomputer 4 calculates an address (coordinates) of each image for its transfer at the resolution and the request size that have been specified by the computer 9. In the next step SP17, in response to a "read" command that is sent from the computer 9, the system control microcomputer 4 controls the operation of the memory control circuit 5B in accordance with a calculation result, to thereby transfer the image data that is held by the memory 7 to the computer 9. In this step, if a transfer of compressed image data is requested by the computer 9, the system control microcomputer 4 sends the image data to the computer 9 after causing it to be compressed by the compression block 10 in the manner described above in connection with FIG. 3.

Then, the process goes to step SP18, where the system control microcomputer 4 judges whether all requests have been dealt with. If a request for transferring the image data that is captured in the memory 7 has been made by the computer 9 by means of an ensuing control command ("set window" command), the process returns to step SP15, where the system control microcomputer 4 accepts specification of a request image size and a resolution that are added to this control command.

If requests for transferring the image data that is held by the memory 7 are repeatedly received from the computer 9, the system control microcomputer 4 repeatedly transfers the image data held by the memory 7 at an image size and a resolution that are specified each time by the computer 9. The process thereafter goes to step SP19 and finishes there.

In the above manner, the system control microcomputer 4 repeatedly transfers image data DV that is captured in the memory 7 at a desired resolution and image size. Therefore, for example, the computer 9 can request, by using some application program, the film scanner 1 to transfer not only image data of 2,048×3,072 pixels but also image data of 128×192 pixels (obtained by decimating the original image data by a factor of 16 in both vertical and horizontal directions), whereby the original image for constructing a database and its thumb nail image for an index can be input to the computer 9 by a single scan. The load on the computer 9 side can be reduced accordingly. If image data of 512×768 pixels that is obtained by decimating the original image data by a factor of 4 is transferred, a low-resolution image can be obtained.

In conventional film scanners, the above kind of thumb nail image is generated by a calculation on the computer 9 side. By generating a thumb nail image or the like on the film scanner 1 side, the load on the computer 9 side can be reduced accordingly.

Figure 5:
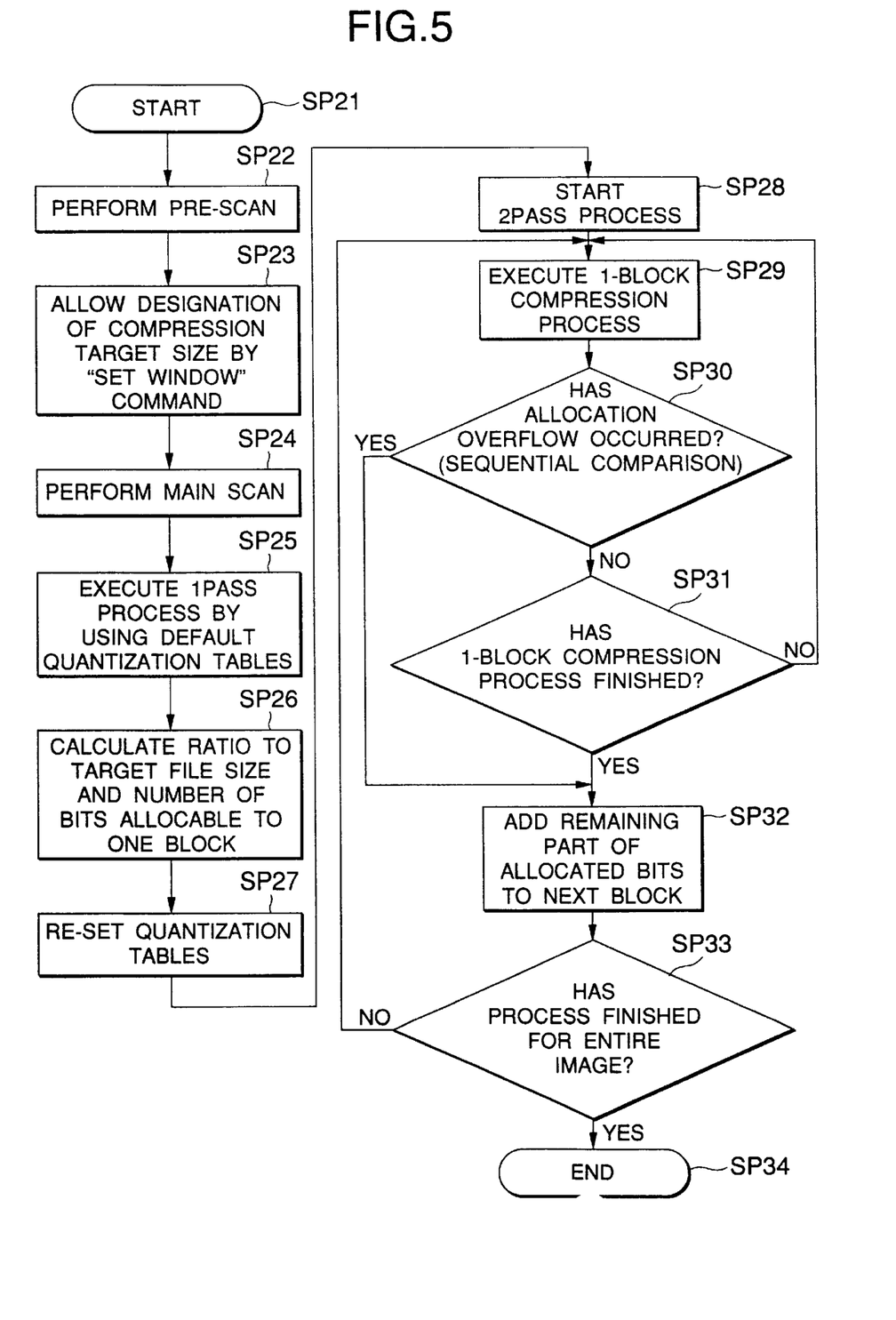
FIG. 5 is a flowchart showing a process of transferring image data at a specified target data amount.

FIG. 5 is a flowchart showing a detailed processing procedure of the system control microcomputer 4 and the compression control microcomputer 11 in a case of transferring image data after compressing it. FIG. 5 is focused on the setting of a data compression ratio. The system control microcomputer 4 sends image data that has been compressed by what is called a 2PASS method with a file size specified by the computer 9.

Specifically, the process goes from step SP21 to SP22, where the system control microcomputer 4 captures image data DV in the memory 7 by a pre-scan. At the next step SP23, the system control microcomputer 4 accepts specification of a target file size of data compression that is made by a "set window" command that is sent from the computer 9. Then, the process goes to step SP24, where the system control microcomputer 4 stores image data DV in the memory 7 by executing a main scan process.

Then, the process goes to step SP25, where the system control microcomputer 4 sets the one-dimensional and three-dimensional look-up tables 5A and 5C and a quantization table of the JPEG compression circuit to default characteristics, and causes the JPEG compression circuit 10A to compress the image data DV that is held by the memory 7. In this step, the system control microcomputer 4 measures the amount of data that is generated by the data compression for each block of 8×8 pixels that is a unit of the JPEG data compression.

Then, the process goes to step SP26. At step SP26, the system control microcomputer 4 allocates the data amount of the target file size that has been specified by the computer 9 based on the measured generated data amounts, and thereby calculates data amounts that can be allocated to the respective blocks.

Then, the process goes to step SP27, where the system control microcomputer 4 compares the data amount that can be allocated to each block with the measured data amount of the block, and calculates a scale factor to be used for changing the setting of the quantization table of the JPEG compression circuit 10A based on a comparison result. The system control microcomputer 4 informs the compression control microcomputer 11 of the scale factor. In this manner, the system control microcomputer 4 re-sets the quantization table on a block-by-block basis and completes what is called a 1PASS process.

Then, the process goes to step SP28, where the system control microcomputer 4 starts a 2PASS process. Specifically, at step SP29, the system control microcomputer 4 transfers the image data that is held by the memory 7 to the compression block 10 and thereby starts compression of one image data with the scale factor of which the compression control microcomputer 11 has been informed at step SP27.

At the next step SP30, the compression control microcomputer 11 judges whether the generated data amount of image data that is obtained by coding coefficient data that are generated by discrete cosine transform in data compression of one block exceeds the allocated data amount that was calculated for this block at step SP27. If a negative judgment result is obtained at step SP30, the process goes to step SP31, where the compression control microcomputer 11 judges whether the coding of all the meaningful coefficient data of the one block have completed. If a negative judgment result is obtained at step SP31, the process returns to step SP29, where the compression control microcomputer 11 causes the next coefficient data of the this block to be coded. In this manner, the compression control microcomputer 11 causes the image data of the one block to be compressed while sequentially judging for each coefficient data whether the generated data amount exceeds the allocated data amount. Then, the process goes from step SP31 to step SP32.

If the generated data amount exceeds the allocated data amount in the sequential comparison process, an affirmative judgment result is obtained at step SP30. In this case, the compression control microcomputer 11 refrains from coding the next coefficient data and the process goes from step SP30 to step SP32 to complete the data compression on this block.

At step SP32, if the generated data amount of this block is smaller than the allocated data amount, the compression control microcomputer 11 adds the remaining portion of the data amount to the allocated data amount of the next block. Then, the process goes to step SP33, where the compression control microcomputer 11 judges whether the process has been executed for all blocks. If a negative judgment result is obtained at step SP33, the process returns to step SP29 to start a process for the next block. On the other hand, if the process has been executed for all blocks, the process goes from step SP33 to step SP34, where the data compression process finishes and the system control microcomputer 4 transfers compressed image data to the computer 9.

In the film scanner 1 having the above configuration, when a pre-scan is instructed by the computer 9 after the film 3B has been mounted on a reel or a holder and placed at a prescribed position (see FIG. 2), the film 3B is moved above the line sensor 3D at a predetermined speed and the line sensor 3D generates red, blue, and green color signals, which are converted into image data DV by analog-to-digital conversion in the signal processing circuit 3E.

In this operation, in the film scanner 1, the image data DV of the respective frames are captured consecutively at a resolution of 128×192 pixels and stored in the memory 7 via the one-dimensional and three-dimensional look-up tables 5A and 5C that are set to the default characteristics.

The gradation and the hue of the image data DV stored in the memory 7 are corrected by the one-dimensional and three-dimensional look-up tables 5A and 5C, respectively, that are set to characteristics that are specified by the computer 9 and a negative-to-positive inversion process is also executed if necessary. Resulting image data are output to the computer 9 via the bus switch 5D and the SCSI control 8. In this manner, images of respective frames of the film 3B can be checked in advance on the computer 9.

An operator who has checked an image of each frame performs manipulations for altering the hue and the gradation. When a control command corresponding to the manipulations is input to the film scanner 1, the contents of the one-dimensional and three-dimensional look-up tables 5A and 5C are changed in accordance with the control command. The image data DV that is held by the memory 7 is corrected in hue and gradation by means of the changed contents of the one-dimensional and three-dimensional look-up tables 5A and 5C and then output to the computer 9. In this manner, on the computer 9 side, the hue and the gradation of an image of each frame can be adjusted and resulting actual variations can be checked without the need for actually processing image data, and hence the load can be reduced accordingly. While conventionally this kind of process is executed on the computer 9 side by a calculation, in this embodiment it is executed by accessing the look-up tables, which makes it possible to reduce the time required for altering the gradation etc.

After desired images are obtained through manipulations of the operator, a main scan process is executed in the film scanner 1 while being controlled by the computer 9. Image data DV of a frame that is designated by the computer 9 is stored in the memory 7 via the one-dimensional and three-dimensional look-up tables 5A and 5C at a read size and a resolution and with hue and gradation that are also specified by the computer 9.

Then, when an instruction to transfer the image data DV in an uncompressed format is made by the computer 9, the image data DV stored in the memory 7 is transferred to the computer 9 via the one-dimensional and three-dimensional look-up tables 5A and 5C that are set to the default characteristics and the SCSI control 8.

On the other hand, when an instruction to transfer compressed image data is made, the image data DV stored in the memory 7 is transferred to the JPEG compression circuit 10A via the one-dimensional and three-dimensional look-up tables 5A and 5C that are set to the default characteristics. The image data DV is compressed into the JPEG format by the JPEG compression circuit 10A and then stored in the memory 7. The compressed image data stored in the memory 7 is then transferred to the computer 9 via the one-dimensional and three-dimensional look-up tables 5A and 5C that are set to the default characteristics and the SCSI control 8.

In this manner, the film scanner 1 can transfer image data of one frame to the computer 9 in a short time. In the computer 9 that receives the image data, the time required for recording the image data in the hard disk drive can be shortened and hence the image data transfer waiting time can be shortened. Further, since the data compression is performed by hardware in the film scanner 1 rather than a calculation in the computer 9, the total processing time can be shortened accordingly. The above improvements make it possible to reduce the time required for processing the film 3B by sequentially transferring image data of images of respective frames of the film 3B while the computer 9 sequentially issues control commands when necessary. Therefore, when images of a film 3B is converted into electronic data in, for instance, a mini-laboratory, the time required for the entire process can be shortened.

As for the data compression, image data DV that is held by the memory 7 is compressed, by what is called the 2PASS method, into a target data amount that is specified by the computer 9 and then stored in the memory 7. Compressed image data is transferred to the computer 9 via the one-dimensional and three-dimensional look-up tables 5A and 5C that are set to the default characteristics and the SCSI control 8.

Therefore, when the film scanner 1 is applied to, for instance, a case of constructing a database by using images of a film 3B, the images of the respective frames can be converted into files having approximately constant data amounts. This makes it possible to assure that access speeds for the respective images of the database are within a predetermined range. Further, the number of files that can be accommodated by a recording medium having a certain capacity that is used in the database can be managed easily, which facilitates construction of the database.

When image data DV that is held by the memory 7 is transferred to the computer 9 directly or after being compressed by the JPEG compression circuit 10A, it is read out from the memory 7 so as to be decimated or changed in read start address if necessary through an address control that is performed by the memory control circuit 5B according to an image size and a resolution that are specified by the computer 9. This facilitates generation of a thumb nail image or the like. When data compression is not performed, a plurality of image data having desired resolutions and image sizes can be transferred repeatedly to the computer 9 for the same image data that is held by the memory 7. For example, in a case of converting images of a film 3B into electronic data, this makes it possible to sequentially capture thumb nail images for indices and original images in a desired manner and hence an ensuing process in the computer 9 can be simplified accordingly. Incidentally, conventionally, this kind of process is executed in such a manner that after image data are transferred to the computer 9, low-resolution images are generated by a resolution conversion process using image processing software. This embodiment makes it possible to eliminate such an ensuing process in the computer 9.

As described above, according to the invention, the time required for transferring image data can be shortened by transferring image data that is compressed in the JPEG format to the computer 9 in response to a request from the computer 9. On the computer 9 side, the time required for recording image data in the hard disk drive can be shortened and an ensuing process can be simplified. Therefore, the time required for capturing image data can be shortened.

Images of respective frames can be converted into files having approximately constant data amounts by outputting each image data after compressing it to satisfy a target data amount that is specified by the computer 9. Where a database is constructed by using those image data, it can be assured that the access speeds of the respective images are within a predetermined range. Further, the number of files that can the accommodated by a recording medium having a certain capacity that is used in the database can be managed easily, which facilitates construction of the database.

By transferring image data that is held by the memory 7 to the computer 9 at an image size and a resolution that are specified by the computer 9, a low-resolution image for an index, for instance, can be generated easily. If necessary, a plurality of image data having desired resolutions and image sizes can be transferred repeatedly to the computer 9 for the same image data that is held by the memory 7. For example, in a case of converting images of a film 3B into electronic data, this makes it possible to sequentially capture thumb nail images for indices and original images in. a desired manner and hence an ensuing process in the computer 9 can be simplified accordingly.

Although the above embodiment is directed to the case where when image data is to be sent without being compressed at all, image data that is held by the memory 7 is transferred repeatedly at various resolutions and image sizes in a desired manner, the invention is not limited to such a case. Also when image data is to be sent after being compressed, image data that is stored in the memory 7 may be transferred repeatedly at various resolutions and image sizes in a manner similar to the above. In this case, in the above embodiment, it is necessary to increase the capacity of the memory 7 so that it can hold both of original image data and compressed image data.

Although the above embodiment is directed to the case of sending image data after correcting its hue, gradation, etc., the invention is not limited to such a case and can broadly be applied to a case where those corrections are performed on the computer 9 side.

Although the above embodiment is directed to the case of compressing image data according to the JPEG technique, the invention is not limited to such a case and can broadly be applied to cases where the data compression is performed according to other various techniques.

Further, although the above embodiment is directed to the case where the invention is applied to a film scanner in which image data DV are captured from a film, the invention is not limited to such a case and can broadly be applied to, for instance, a case where image data DV are captured by an image scanner.

What is claimed is:

1. An image reading apparatus comprising:
    capturing means for capturing image data from an existing image;
    adjusting means for adjusting the image data captured by said capturing means;
    a memory for storing the image data adjusted by said adjusting means;
    memory control means for controlling data writing and reading to and from the memory;
    data compressing means for compressing the image data stored in the memory into compressed image data; and
    transmission control means for controlling transmission of the compressed image data via a data communication interface.

2. The image reading apparatus according to claim 1, wherein the data compressing means includes means for compressing the image data stored in the memory according to a predetermined format for compression of a still image.

3. The image reading apparatus according to claim 1, wherein the data compressing means includes means for compressing the image data so that the compressed image data will have a data amount close to a target data amount specified by a command input via the interface.

4. The image reading apparatus according to claim 1, wherein the memory control means includes means for changing a size of an image of the image data by reading out the image data from the memory while decimating the image data at a ratio specified by a command input via the interface.

5. The image reading apparatus according to claim 1, wherein the memory control means includes means for changing a resolution of an image of the image data by reading out the image data from the memory at a resolution specified by a command input via the interface.

6. The image reading apparatus according to claim 5, wherein the memory control means generates image data for a thumb nail image by reading out the image data from the memory at a diminished resolution specified by a command input via the interface.

7. The image reading apparatus according to claim 1, wherein the adjusting means includes means for adjusting a gradation of the image data captured by the capturing means based on a specification indicated by a command input via the interface.

8. The image reading apparatus according to claim 1, wherein the adjusting means includes means for executing a negative-to-positive inversion process on the image data captured by the capturing means when the existing image is a negative film.

9. The image reading apparatus according to claim 1, wherein the adjusting means includes means for adjusting the image data captured by the capturing means according to a default characteristic in a pre-scan of the existing image.

10. The image reading apparatus according to claim 1, wherein the adjusting means includes means for adjusting the image data captured by the capturing means according to a default characteristic when the image data is not to be compressed by the data compressing means.

11. The image reading apparatus according to claim 1, wherein the adjusting means comprises a bus switch, and by switching the bus switch the adjusting means supplies the image data to the data compressing means when the image data is to be compressed by the data compressing means and supplies the image data to the transmission control means when the image data is not to be compressed.

* * * * *

UNITED STATES PATENT AND TRADEMARK OFFICE
CERTIFICATE OF CORRECTION

PATENT NO.        : 6,118,116
APPLICATION NO.   : 09/136756
DATED             : September 12, 2000
INVENTOR(S)       : Koichi Sawada, Hideki Wanami and Makoto Goto Page 1 of 1

It is certified that error appears in the above-identified patent and that said Letters Patent is hereby corrected as shown below:

On the title page, item (54) and in the specification, column 1, line 1, Change "IMAGE READING APPARATUS HAVING A MEMORY WITH COMPRESSED IMAGE DATA" to --IMAGE READING APPARATUS--.

Signed and Sealed this
Fifth Day of April, 2016

Michelle K. Lee
*Director of the United States Patent and Trademark Office*